United States Patent
Jain et al.

(10) Patent No.: US 12,244,560 B2
(45) Date of Patent: *Mar. 4, 2025

(54) ENFORCEMENT OF INTER-SEGMENT TRAFFIC POLICIES BY NETWORK FABRIC CONTROL PLANE

(71) Applicant: Cisco Technology, Inc., San Jose, CA (US)

(72) Inventors: Prakash C. Jain, Fremont, CA (US); Sanjay Kumar Hooda, Pleasanton, CA (US); Satish Kumar Kondalam, Milpitas, CA (US); Vikram Vikas Pendharkar, San Jose, CA (US); Anoop Vetteth, Fremont, CA (US); Solomon T Lucas, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/478,942

(22) Filed: Sep. 29, 2023

(65) Prior Publication Data

US 2024/0031333 A1 Jan. 25, 2024

Related U.S. Application Data

(63) Continuation of application No. 17/084,453, filed on Oct. 29, 2020, now Pat. No. 11,818,096.

(51) Int. Cl.
*H04L 9/40* (2022.01)
*H04L 41/0894* (2022.01)
*H04L 47/70* (2022.01)

(52) U.S. Cl.
CPC ........ *H04L 63/0227* (2013.01); *H04L 47/825* (2013.01); *H04L 2212/00* (2013.01)

(58) Field of Classification Search
CPC ............... H04L 63/0227; H04L 47/825; H04L 2212/00; H04L 41/0894; H04L 63/164; H04L 63/0263; H04L 63/0272
See application file for complete search history.

(56) References Cited

U.S. PATENT DOCUMENTS 10,015,132 B1 * 7/2018 Qin ...................... H04L 61/2567
10,152,604 B1 * 12/2018 Diaz .................... G06F 21/6209
(Continued)

FOREIGN PATENT DOCUMENTS

| CN | 110381025 B | 8/2020 |
| WO | WO2020112345 | 6/2020 |
| WO | WO2020112345 A1 | 6/2020 |

OTHER PUBLICATIONS

Indian Office Action mailed Dec. 20, 2023 for Indian Application No. 202347030315, a foreign counterpart to U.S. Pat. No. 11,818,096, 6 pages.

(Continued)

*Primary Examiner* — Aftab N. Khan
(74) *Attorney, Agent, or Firm* — Lee & Hayes, P.C.

(57) ABSTRACT

This disclosure describes techniques to operate a control plane in a network fabric. The techniques include determining a stateless rule corresponding to communication between a first segment of the network fabric and a second segment of the network fabric. The techniques further include configuring the control plane to enforce the stateless rule.

20 Claims, 7 Drawing Sheets

(56) References Cited

U.S. PATENT DOCUMENTS

| | | | |
|---|---|---|---|
| 10,742,512 B2* | 8/2020 | Steinhauer | H04L 41/12 |
| 11,089,064 B1* | 8/2021 | Sarukkai | H04L 41/0894 |
| 11,201,854 B2* | 12/2021 | Valluri | H04L 45/02 |
| 11,818,096 B2* | 11/2023 | Jain | H04L 41/0894 |
| 2004/0003070 A1* | 1/2004 | Fernald | H04L 43/00 709/223 |
| 2004/0131059 A1* | 7/2004 | Ayyakad | H04L 45/60 370/252 |
| 2018/0359151 A1* | 12/2018 | Akhavain Mohammadi | H04L 41/0893 |
| 2018/0367337 A1 | 12/2018 | Jain et al. | |
| 2019/0020489 A1* | 1/2019 | Moreno | H04L 41/0894 |
| 2019/0116119 A1* | 4/2019 | Chu | H04L 45/586 |
| 2019/0132360 A1 | 5/2019 | Shin et al. | |
| 2020/0036593 A1* | 1/2020 | Sethi | H04L 41/0894 |
| 2020/0076769 A1 | 3/2020 | Mishra | |
| 2020/0177550 A1* | 6/2020 | Valluri | H04L 41/0806 |
| 2020/0204520 A1* | 6/2020 | Pan | H04L 63/1408 |
| 2021/0168125 A1* | 6/2021 | Vemulpali | H04L 9/3236 |
| 2021/0320899 A1* | 10/2021 | Homma | H04L 61/5076 |
| 2022/0141181 A1 | 5/2022 | Jain et al. | |

OTHER PUBLICATIONS

Office Action for U.S. Appl. No. 17/084,453, mailed on Mar. 6, 2023, Inventor #1 Prakash C. Jain, "Enforcement of Inter-Segment Traffic Policies by Network Fabric Control Plane", 11 pages.

Office Action for U.S. Appl. No. 17/084,453, mailed Jul. 11, 2022, Jain, Enforcement of Inter-Segment Traffic Policies by Network Fabric Control Plane, 9 pages.

International Search Report and Written Opinion for PCT Application No. PCT/US21/57074, mailed Feb. 14, 2022.

* cited by examiner

ENFORCEMENT OF INTER-SEGMENT TRAFFIC POLICIES BY NETWORK FABRIC CONTROL PLANE

RELATED APPLICATIONS

This application claims priority to and is a continuation of U.S. patent application Ser. No. 17/084,453, filed on Oct. 29, 2020, the entire contents of which are incorporated herein by reference.

TECHNICAL FIELD

The present disclosure relates generally to enforcement of inter-segment traffic policies and, more specifically, to enforcement of inter-segment traffic policies by a network fabric control plane.

BACKGROUND

Virtual routing and forwarding (VRF) technology is becoming more prevalent in networks such as enterprise networks. VRF is a technology utilized in internet protocol (IP) networks, in which multiple instances of a routing table, simultaneously present within a single router, are utilized simultaneously. As a result, network paths may be segmented without using multiple routers.

For example, one or more logical or physical interfaces may belong to a respective VRF; the term "VRF" may be used to refer to one of the segments of the overall network. VRFs do not share routing tables and, therefore, IP packets routed along network paths of a particular VRF are only forwarded between interfaces on the same VRF. For example, a VRF may be thought of as a layer 3 equivalent of a layer 2 Virtual Local Area Network (VLAN). Network segmentation, including VRF technology and other types of segmentation, is an architectural approach that divides a network into multiple segments, each acting as its own small network. This segmentation allows network administrators to control the flow of traffic between segments based on granular policies that are may be enforced by border routers and/or firewalls.

An enterprise network utilizing VRF technology may be deployed with at least one firewall to, for example, regulate communication between VRFs in the enterprise network in addition to regulating other data traffic including, for example, data traffic to/from outside the enterprise network.

For example, the network fabric may not allow inter-VRF communication. Rather, inter-VRF communication may be regulated using external firewalls and/or fusion routers. For example, a fusion router may connect to a VRF-aware router with the fusion router's interfaces in a common VRF (typically the default VRF) while a VRF-aware router has interfaces in all of the VRFs for which inter-VRF communication may occur. In addition, a firewall may provide security for inter-VRF communication, applying firewall policies such as policies to block or allow certain types of network traffic not specified in a policy exception. The firewalls and fusion routers may advertise required routes to the network, to attract relevant traffic and apply a firewall policy to the traffic, including the inter-VRF communication.

Along with VRF technology, software defined access (SDA) technology is also becoming more prevalent. For example, SDA may be useful in an environment in which mobile devices are being more commonly used to access enterprise network resources. With SDA, such access can be securely provided. But implementing the policy enforcement via one or more firewalls and one or more external routers becomes more challenging and costly due to the number and power of external devices (e.g., firewall & fusion routers) and complex configurations that may be utilized to handle these larger number of mobile devices and network segments.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
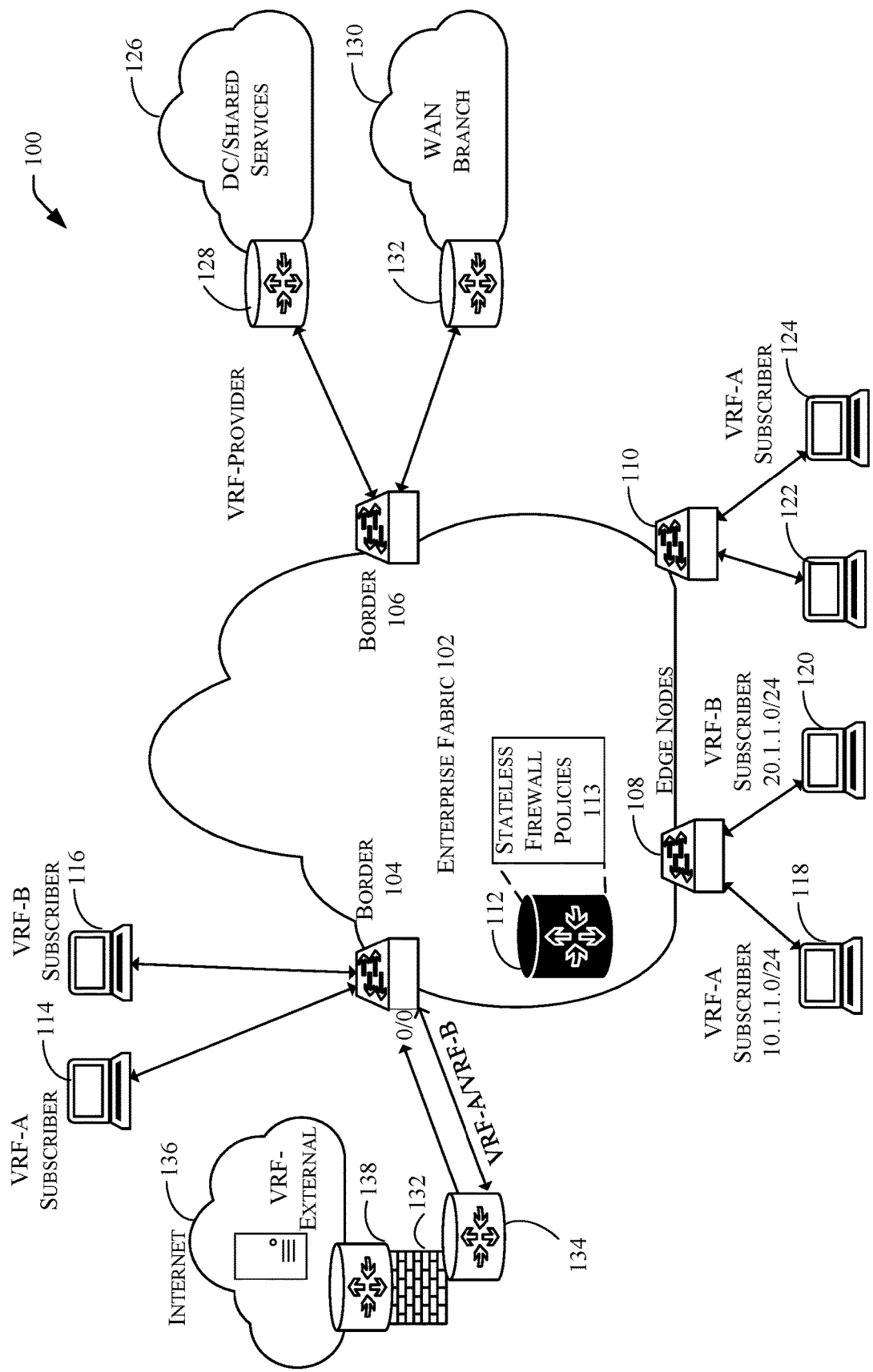
FIG. 1 is an architecture diagram illustrating an example network in which an enterprise fabric control plane configures stateless firewall policies.

This disclosure describes techniques to operate a network fabric control plane in a network fabric. The techniques include determining a stateless rule corresponding to communication between a first segment of the network fabric and a second segment of the network fabric. The techniques further include configuring the network fabric control plane to enforce the stateless rule.

Additionally, the techniques described herein may be performed by a system and/or device having non-transitory computer-readable media storing computer-executable instructions that, when executed by one or more processors, performs the methods described herein.

Example Embodiments

Locator/ID Separation Protocol (LISP), defined in RFC 6830 ("The Locator/ID Separation Protocol (LISP)," dated January 2013), is a routing and addressing architecture of the Internet Protocol. The LISP routing architecture addresses issues related to scaling, multihoming, inter-site traffic engineering, and mobility. An address on the Internet combines location (how the device is attached to the network) and identity semantics in a single 32-bit (IPv4 address) or 128-bit (IPv6 address) number. LISP separates the location from the identity. In simple words, with LISP, where a device is (the network layer locator) in a network can change, but who a device is (the network layer identifier) in the network remains the same. LISP separates the end user device identifiers from the routing locators used by others to reach them. The LISP routing architecture design splits the device identity—that is, the endpoint identifier (EID)—from its location—that is, the routing locator (RLOC).

The LISP control plane has similarities to the Domain Name System (DNS)DNS. For example, DNS resolves a hostname of a device to an IP address, so that other devices can communicate with the device over an IP network. LISP, on the other hand, resolves an EID to an RLOC. With traditional IP routing, in the routing table is populated with IP prefixes. LISP does not populate the routing able with EID-prefixes. Rather, LISP uses a distributed mapping system where EIDs are mapped to RLOCs. These mappings are stored in a distributed EID-to-RLOC database. When an ingress tunnel router (ITR) needs to find an RLOC address, it sends a Map-Request query to the mapping system of the LISP protocol. Usually, the LISP protocol works within the context of a virtual network (VN) or VRF or "LISP Instance." VNs/VRFs are usually isolated from each other, such that end points in one VN/VRF cannot communicate with end points in another VN/VRF. A LISP extranet enables this communication, such as to allow shared services between provider VN/VRF and subscriber VNs/VRFs. Subscriber VNs/VRFs can communicate with a provider VN/VRF, but one subscriber VN/VRF generally cannot communicate with another subscriber VN/VRF.

In some examples, subscribers to different VRFs can communicate with a VRF provider, but the subscribers to different VRFs cannot communicate with each other. Techniques disclosed herein may provide inter-VRF/VN/Group firewall policy enforcement in the enterprise network fabric, such as by enhancing the existing LISP protocol and its inter-VRF communication capabilities which may, for example, enable a subscriber to one VRF to communicate with a subscriber to a different VRF, if an SDA fabric control plane is configured with policies to allow such inter-VRF communication. For example, the policies may be stateless firewall policies, such that the policy can be enforced based on the content of a single packet, without reference to the content of a packet that precedes the single packet or to the content of a packet that succeeds the single packet. For example, the policy may reference a source IP address and a destination IP address in the single packet. The SDA fabric control plane may determine, based on the policy and based on the source IP address and the destination IP address in the single packet, that the SDA fabric control may allow the packet to be communicated from a device assigned the source IP address to a device assigned the destination IP address. Examples of other information that the SDA fabric control plane may use in processing policies may include per-packet transmission control block (TCB) information or network header information.

In one example, the enterprise fabric, such as the SDA fabric control plane, handles inter-VRF/VN/Group firewall policy enforcement with an enhancement to the existing LISP protocol and its inter-VRF communication capabilities and without consuming expensive router access control list (ACL) or ternary content-addressable memory (TCAM) resources. As discussed above, the LISP protocol is defined in RFC 6830. The enhancement may include at least two scenarios. In a first scenario, a firewall (that is typically external to the SDA fabric) advertises specific prefixes to attract inter VN traffic from devices in the enterprise that are connected to the SDA fabric. In a second scenario, the firewall advertises a default 0/0 route, to attract all VN traffic from the enterprise.

In accordance with the LISP protocol, the SDA fabric enforces the inter VN/VRF policies using a map server/map resolver (MSMR), such as is illustrated in the following example:

extranet ext1
    eid-record-provider instance-id 3 (VRF-Provider)
    30.0.0.0/8
    ip-any
    !
    eid-record-subscriber instance-id 1 (VRF-A)
    10.0.0.0/8
    ip-any
    !
    eid-record-subscriber instance-id 2. (VRF-B)
    20.0.0.0/8
    ip-any
    !
    . . .
    !

Thus, for example, subscriber VRF-A and subscriber VRF-B can each communicate with the VRF-Provider. However, subscriber VRF-A and subscriber VRF-B cannot communicate with each other since, according to the LISP protocol, inter-VRF subscriber to subscriber communication is not allowed. Furthermore, existing extranet policy with 'ip-any' allows learning of new prefixes in the policy if those prefixes are registered in instance/VRF on the MSMR. In addition, the policy does not allow for any over-lapping prefixes to be learned in different VRFs at the same time.

This disclosure describes an extension to existing LISP policy with an extended policy, an example of which follows:

extranet ext1
    eid-record-provider instance-id 3
    . . .
    !
    eid-record-subscriber instance-id 1
    10.0.0.0/8
    ip-any
    service <id>{s2s/firewall} instance 2
    [<prefix>/all/ip-any]
    !
    eid-record-subscriber instance-id 2
    20.0.0.0/8
    ip-any
    service <id>{s2s/firewall} instance 1
    [<prefix>/all/ip-any]
    !

The following lines inserting s2s/firewall service in the policy will allow subscriber VRF-A (instance-id 1) to communicate with VRF-B (instance-id 2).

service <id>{s2s/firewall} instance 2
    [<prefix>/all/ip-any]
and
    service <id>{s2s/firewall} instance 1
    [<prefix>/all/ip-any]

The inter-VRF communication may be for

"Ip-any": Any "learned" inter-VRF prefixes between two VRFs.

"All": All prefixes of the inter-VRFs (both VRFs) are allowed to communicate via policy.

"Configured": given/known <prefixes> of inter-VRFs are allowed to communicate via policy.

Thus, for example, the SDA fabric control plane may dynamically/automatically learn "all" prefixes for stateless policies enforced by a cross-VRF firewall, while the firewall may still enforce policies for internet traffic and/or other stateful policies. For example, due to an existing extranet policy, an MSMR of the SDA fabric control plane may already know and/or learn all individual prefixes of each subscriber VRFs (such as 10/8 for VRF-A & 20/8 for VRF B, in the above example configuration) that are allowed to talk to a provider VRF.

Thus, for example, the firewall may send a 0/0 route to a border of the SDA fabric. Consequently, the border router may register the 0/0 route to an MSMR via a default proxy ingress/egress tunnel router (PxTR) registration for s2s/firewall service. A PxTR may be a combination of a proxy ingress tunnel router (PITR) and proxy egress tunnel router (PETR) in the same physical device, where the distinction between PITR and PETR is based on the direction of the flow with functions of de-encapsulation or encapsulation.

PITRs allow for non-LISP sites to send packets to LISP sites. PITRs perform two primary functions. One primary function is originating EID advertisements. PITRs advertise highly aggregated EID-prefix space on behalf of LISP sites to the non-LISP sites so that the non-LISP sites can reach them. Another primary function is encapsulating legacy Internet traffic. PITRs encapsulate non-LISP Internet traffic into LISP packets and route them toward their destination RLOCs. PETRs are used to allow traffic from LISP sites to non-LISP sites. A PETR acts as an ETR for traffic sourced from LISP sites and destined to non-LISP sites.

As a result of the border router registering the 0/0 route to an MSMR via a default proxy ingress/egress tunnel router registration for s2s/firewall service, the MSMR may form a complete prefix list of all prefixes of inter-VRFs communication. The MSMR itself may thus build and apply inter-VRF policy for all prefixes, offloading this processing from a firewall/fusion router in the fabric.

As a result of s2s/firewall default-etr registration, the external firewall can still enforce policies on internet traffic. This includes registering the default PETR to the MSMR. This would allow the MSMR to redirect all unknown/internet traffic on an ingress tunnel router towards this registered PETR. That is, a PETR connects a LISP-capable site to a non-LISP-capable core network such as the internet by), the ETR and MSMR publishing EID-to-RLOC mappings for the site, responding to Map-Request messages, and decapsulating and delivering LISP-encapsulated user data to end systems at the site. During operation, the ETR sends periodic Map-Register messages to all its configured MSMRs. The Map-Register messages contain all the EID-to-RLOC entries for the EID-numbered networks that are connected to the site of the ETR.

For example, an ETR that receives a Map-Request message verifies that the request matches an EID for which the ETR is authoritative, constructs an appropriate Map-Reply message containing the configured mapping information of the ETR, and sends the message to the ITR whose RLOCs are listed in the Map-Request message. An ETR that receives a LISP-encapsulated packet that is directed to one of its RLOCs decapsulates the packet, verifies that the inner header is destined for an EID-numbered end system at its site, and then forwards the packet to the end system using site-internal routing.

In accordance with another scenario, the SDA fabric control plane may dynamically/automatically learn specific prefixes for stateless policies enforced by a cross-VRF firewall. For cross-VRF communications, the firewall advertises the specific prefixes of traffic from one VRF to other VRFs, and vice versa—such as traffic from VRF-A into VRF-B, and vice-versa. These prefixes may then be route imported in LISP at the border router and, consequently, registered to the MSMR by the border router. Since an existing inter-VRF/extranet policy has "ip-any" in all subscriber VRFs, these registered prefixes (from firewall advertisement) would try to be added into existing inter-VRF/Extranet policy. These incoming inter-VRF prefixes would be overlapping with VRF's own prefixes in the policy and may be rejected, since "overlapping" may not be allowed according to certain policy conditions. However, the MSMR may identify these over-lapping prefixes coming to the policy and since "new/proposed/modified policy" has ip-any as part of "service s2s/firewall," learn these prefixes as firewall prefixes in the MSMR.

Once the MSMR learns these prefixes, the learned prefixes may be provided to the DNAC/controller to make those prefixes "configured prefixes." Once the DNAC configures these prefixes to the MSMR, the MSMR can enforce the inter-VRF policy without the aid of the firewall in the fabric for inter-VRF communication. For example, the procedure may allow only selective prefixes to communicate across the subscriber VRFs, thus allowing the kind of control, applying stateless policies, that an external firewall might otherwise provide.

FIG. 1 is an architecture diagram illustrating an example network 100 in which an enterprise fabric control plane configures stateless firewall policies. The network 100 includes an enterprise fabric 102 which may be, for example, an SDA network that includes a VRF-A and a VRF-B. The network 100 includes a border router 104 and a border router 106. The network 100 further includes an edge router 108 and an edge router 110. The enterprise fabric 102 also includes one or more MSMRs 112; the control plane of the enterprise fabric 102 comprises at least the MSMRs 112. The MSMRs 112 include stateless firewall policies 113.

A subscriber 114 to VRF-A is coupled to the enterprise fabric 102 via the border router 104. A subscriber 116 to VRF-B is coupled to the enterprise fabric 102 via the border router 104. A subscriber 118 to VRF-A is coupled to the enterprise fabric 102 via the edge router 108. A subscriber 120 to VRF-B is coupled to the enterprise fabric 102 via the edge router 108. A subscriber 122 to VRF-A is coupled to the enterprise fabric 102 via the edge router 110. A subscriber 124 to VRF-A is coupled to the enterprise fabric 102 via the edge router 110.

The enterprise fabric 102 is coupled to a VRF-provider subnetwork 126, such as an extranet, via the border router 106 and via an external router 128. The enterprise fabric 102 is coupled to a WAN branch 130 via the border router 106 and via an external router 130.

The enterprise fabric 102 is coupled to a firewall 132 via the border router 104 and via an external router 134. The firewall 132 is coupled to the internet (VRF-external) via an external router 138.

To facilitate control of inter-VRF communication by the enterprise fabric control plane, including by the MSMRs 112, the firewall 132 sends a 0/0 route to the enterprise fabric 102 via the external router 134 and the border router 104. The border router 104 monitors the router and generates a default proxy ingress/egress tunnel router (PxTR) registration for s2s/firewall service. The MSMRs 112, as a result, form a complete prefix list of all prefixes for inter-VRFs communication. Due to the extranet policy, the MSMRs 112 already know and/or learn all individual prefixes of each subscriber VRFs that are allowed to communicate with the VRF-provider subnetwork 126.

In this way, the MSMRs 112 build and apply inter-VRF policy for all prefixes, to offload stateless policy application for inter-VRF communication. A firewall 132 and/or border router in the enterprise fabric 102 might otherwise apply stateless policies to such inter-VRF traffic. Due to the subscriber-to-subscriber (s2s) default-etr registration, internet traffic may still be reviewed by the external firewall 132.

Figure 2:
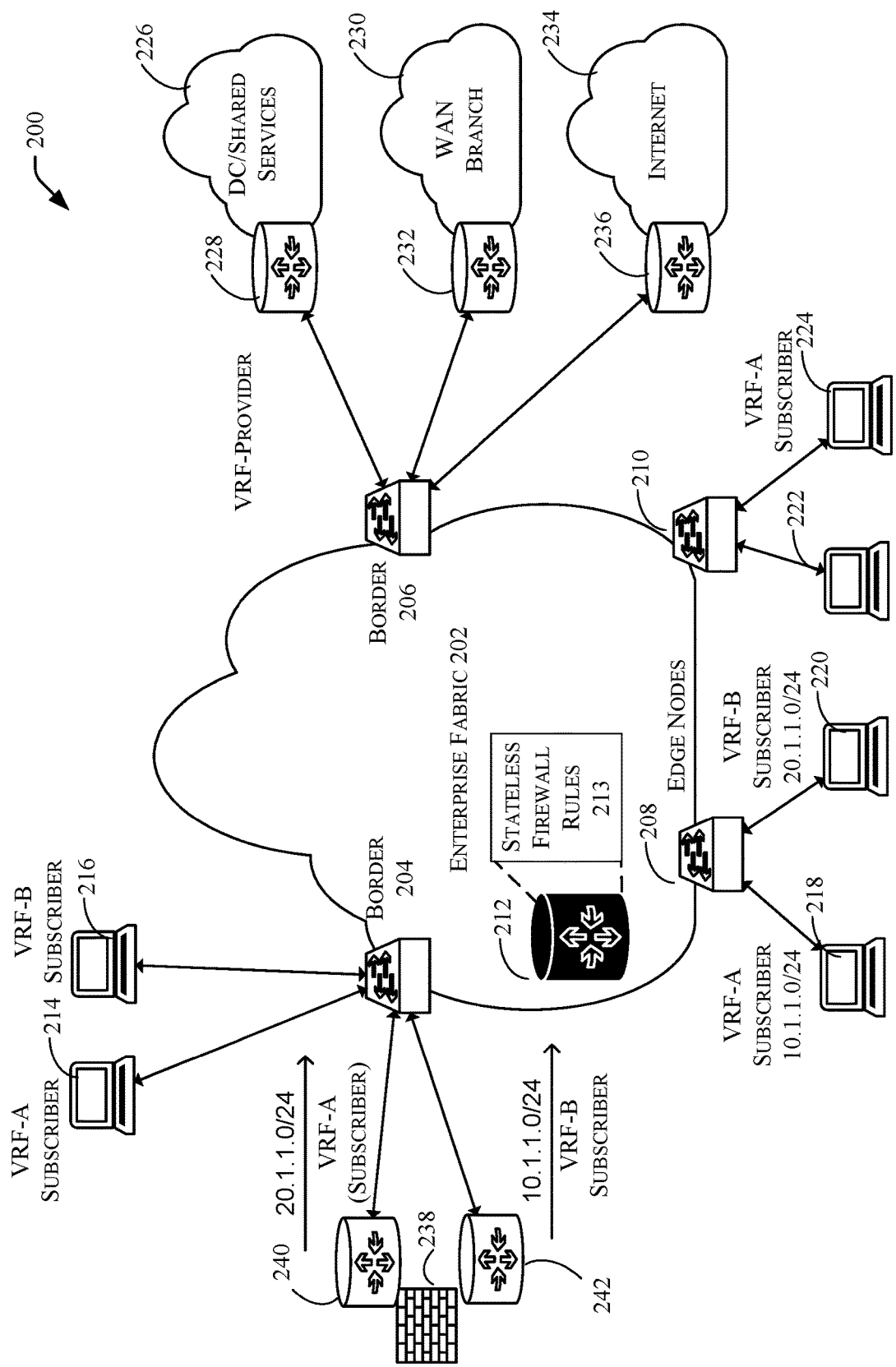
FIG. 2 is an architecture diagram illustrating another example network in which an enterprise fabric control plane configures stateless firewall policies.

FIG. 2 is an architecture diagram illustrating another example network 200 in which an enterprise fabric control plane configures stateless firewall policies. The network 200 includes an enterprise fabric 202 which may be, for example, an SDA network that includes a VRF-A and a VRF-B. The network 200 includes a border router 204 and a border router 206. The network 200 further includes an edge router 208 and an edge router 210. The enterprise fabric 202 also includes one or more MSMRs 212; the control plane of the enterprise fabric 202 comprises at least the MSMRs 212. The MSMRs 212 include stateless firewall policies 213.

A subscriber 214 to VRF-A is coupled to the enterprise fabric 202 via the border router 204. A subscriber 216 to VRF-B is coupled to the enterprise fabric 202 via the border router 204. A subscriber 218 to VRF-A is coupled to the enterprise fabric 202 via the edge router 208. A subscriber 220 to VRF-B is coupled to the enterprise fabric 202 via the edge router 208. A subscriber 222 to VRF-A is coupled to the enterprise fabric 202 via the edge router 210. A subscriber 224 to VRF-A is coupled to the enterprise fabric 202 via the edge router 210.

The enterprise fabric 202 is coupled to a VRF-provider subnetwork 226, such as an extranet, via the border router 206 and via an external router 228. The enterprise fabric 202 is coupled to a WAN branch 230 via the border router 206 and via an external router 230.

The enterprise fabric 202 is coupled to a VRF-provider subnetwork 226, such as an extranet, via the border router 206 and via an external router 228. The enterprise fabric 202 is coupled to a WAN branch 230 via the border router 206, and via an external router 240 and an external router 242.

For inter-VRF communication, the firewall 238 advertises the specific prefixes of VRF-A into VRF-B (or vice-versa). In the FIG. 2 example, there is one each of the VRF-A prefix −20.1.1.0/24—and the VRF-B prefix −10.1.1.0/24. The VRF-A prefixes and the VRF-B prefixes are then route imported in LISP at the border router 204 and, consequently, the border router 204 registers the prefixes of VRF-A and VRF-B to the MSMR 212. The cross-VRF/extranet policy has "ip-any" in all subscriber VRFs, so the MSMR 212 will attempt to register the prefixes (from the firewall advertisement) by adding them into the existing inter-VRF/Extranet policy. The incoming inter-VRF prefixes would overlap with the VRF's own prefixes in the policy, and the MSMR 212 may reject them since "overlapping" prefixes may not be allowed.

However, the MSMR 212 may identify the overlapping prefixes based, for example, by the "new/proposed/modified policy" having ip-any as part of "service s2s/firewall." The MSMR 212 may learn these prefixes as firewall prefixes and, once the MSMR 212 learns these prefixes, the MSMR 212 can be configured with the prefixes and can enforce the inter-VRF policy exclusive of the firewall 238. For example, the prefixes can be communicated to a central controller to make these prefixes as "configured prefixes," and the central controller can configure the MSMR 212 with these prefixes in the fabric for inter-VRF communication.

The configuration of the MSMR 212 in this way may allow only the selected prefixes to communicate across the subscriber VRFs, thus allowing the kind of stateless control that firewalls provide.

Figure 3:
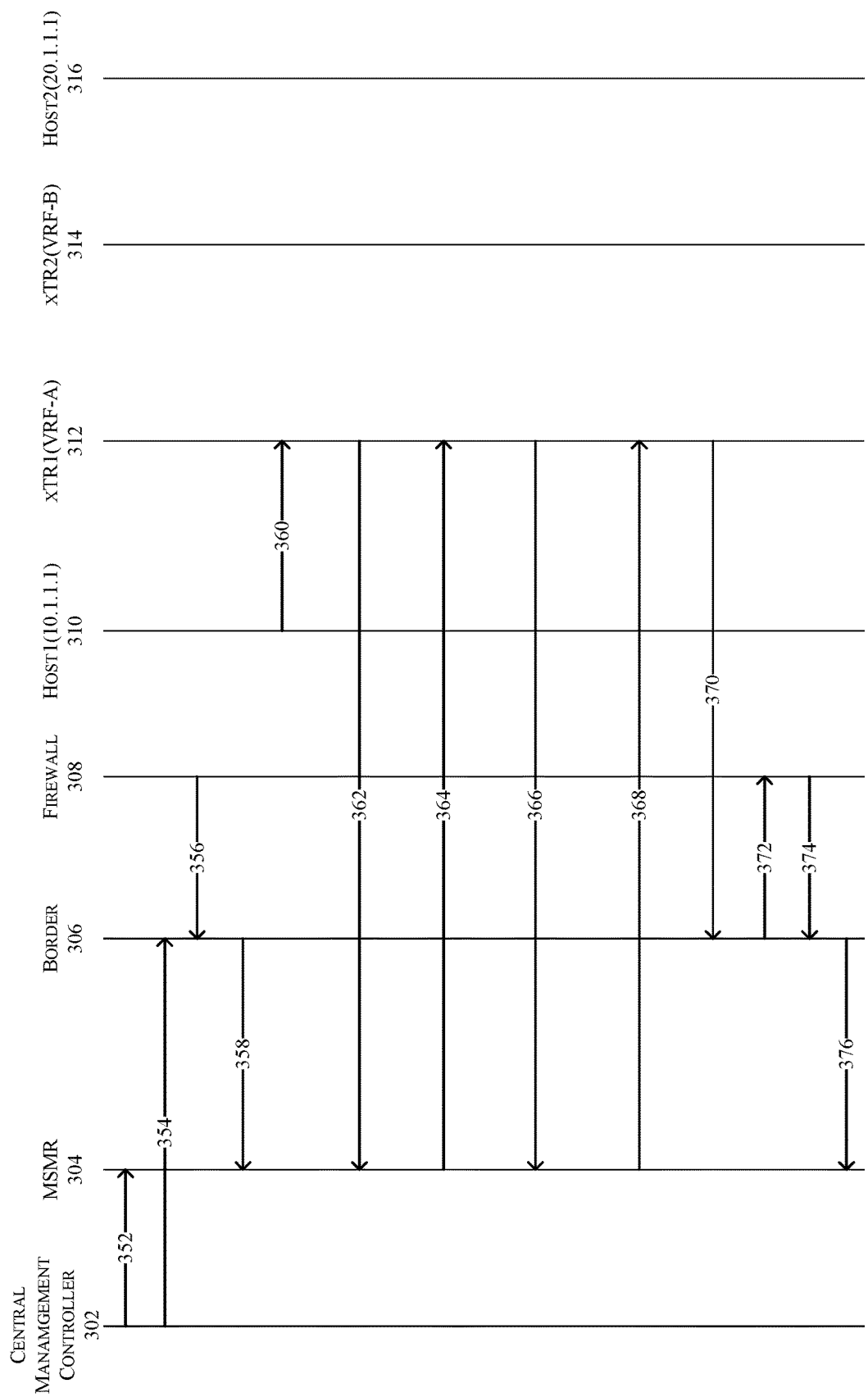
FIG. 3 is a flow diagram illustrating data and timing flow for an example in which an enterprise fabric control plane configures stateless firewall policies.

FIG. 3 is a flow diagram illustrating data and timing flow for an example in which an enterprise fabric control plane configures stateless firewall policies. An external firewall advertises a default 0/0 route to attract all VN traffic from the enterprise fabric. The network includes a central management controller 302. The central management controller 302 may, for example, provide a controller and analytics platform with a single dashboard for administrators to configure the network from a centralized location. The network also includes a mapping database front end which, in the FIG. 3 example, is a LISP MSMR. The network also includes a border router 306, via which a firewall 308 is accessible to the enterprise fabric. A first host 310 (Host1) belongs to a VRF having prefix 10.1.1.1. The first host 310 is coupled to the enterprise fabric via an external router 312 (xTR1). An external router 314 (xTR2) couples a second host 316 (Host2), which belongs to a VRF having prefix 20.1.1.1, to the enterprise fabric.

At 352, the central management controller 302 communicates with the MSMR 304. In particular, the central management controller 302 provides a message to the MSMR 304 to configure the Service S2S/Firewall policy to learn ("all") subscriber1 to subscriber2 firewall prefixes as part of extranet policy. That is, the central management controller 302 provides a message to the MSMR 304 to configure the firewall 308 to learn all subscriber 1 to subscriber 2 prefixes as part of the extranet policy.

At this point, the extranet policy table of the MSMR 304 knows all subscriber prefixes since 10/8 and 20/8 are already part of subscriber VRF-A (10/8 subnet) and VRF-B (20/8 subnet). The MSMR 304 automatically adds inter-VRF prefixes \n (10/8 in VRF-B & 20/8 in VRF-A) in service policy table of corresponding VRF (since service policy has "all")

At 354, the central management controller 302 configures the border router 306 with a LISP "Default-ETR" with s2s/firewall service to monitor the 0/0 router advertised by the firewall 308.

At 356, the firewall 308 advertises, to the border router 306, the 0/0 route in VRF-A and in VRF-B \n, to attract all VRF traffic.

The border router 306, meanwhile, monitors the 0/0 route and registers the routes to the MSMR 304. That is, at 358, the border router 306 provides the MSMR 304 with a map registration of default-etr with firewall/s2s service. The registration may not be provided to the site registration table of the MSMR 304 but, instead, may go into the default-etr/internet policy table as a service RLOC or default-service-etr.

At 360, the Host1 (10.1.1.1) communicates with xTR1 (VRF-A) 312. The xTR1(VRF-A) 312 receives traffic from source host1 310 in subnet 10/8 for a destination in (host2 316).

At 362, the xTR1(VRF-A) 312 communicates with the MSMR 304 to provide a map request for a destination in subnet 20/8. The MSMR 304 looks up in its own instance table first, then the extranet table, then the service policy table of the source instance, finding the destination 20/8 subnet address in the s2s/firewall Service Policy table.

At 364, the MSMR communicates with the xTR1(VRF-A) 312. That is, the MSMR 304 map replies with the xTR2 RLOC if s2s/firewall policy allows 10/8 to 20/8 communication. Otherwise, the MSMR map replies with a negative map-reply with "drop." This indicates that the firewall 308 may not be involved for inter-VRF traffic if the configured service is "s2s." The MSMR 304 sends a regular map-reply with xTR2 as the RLOC if the configured service is "firewall." The MSMR 304 sends a regular map-reply with registered service-default-etr (Border) as RLOC.

At 366, the xTR1(VRF-A) 312 communicates with the MSMR 304, providing a map request for an internet destination.

At 368, the MSMR 304 communicates with the xTR1 (VRF-A) 312. The MSMR 304 map replies (UMR or negative map reply) with service-default-etr as the RLOC since the destination is not found in the local VRF and is not in the extranet policy table but, rather, is found in the service_default_etr in default-etr/internet table of the local VRF. Meanwhile, the xTR1(VRF-A) 312 receives a map-reply with the border RLOCC, installs it into the map-cache and sends the encapsulated packet to the border router 306 (or service-default-etr).

At 370, the xTR1(VRF-A) 312 provides the encapsulated traffic to the border router 306. At 372, the border router 306 decapsulates the traffic and sends the internet traffic to the firewall 308. If the policies in the firewall 308 allow, the firewall 308 allows the internet traffic to be sent to the internet.

At 374, the firewall 308 communicates to the border router 306 to withdraw the 0/0 routes.

At 376, the border router 306 communicates to the MSMR 304 to deregister the default-etr with s2s/firewall. No traffic via the s2s/firewall affects this deregistration.

As illustrated by the FIG. 3 flow diagram, the MSMR 304 can handle stateless firewall policies, thus lessening the involvement of the firewall 308 with the validation of inter-VRF traffic.

Figure 4:
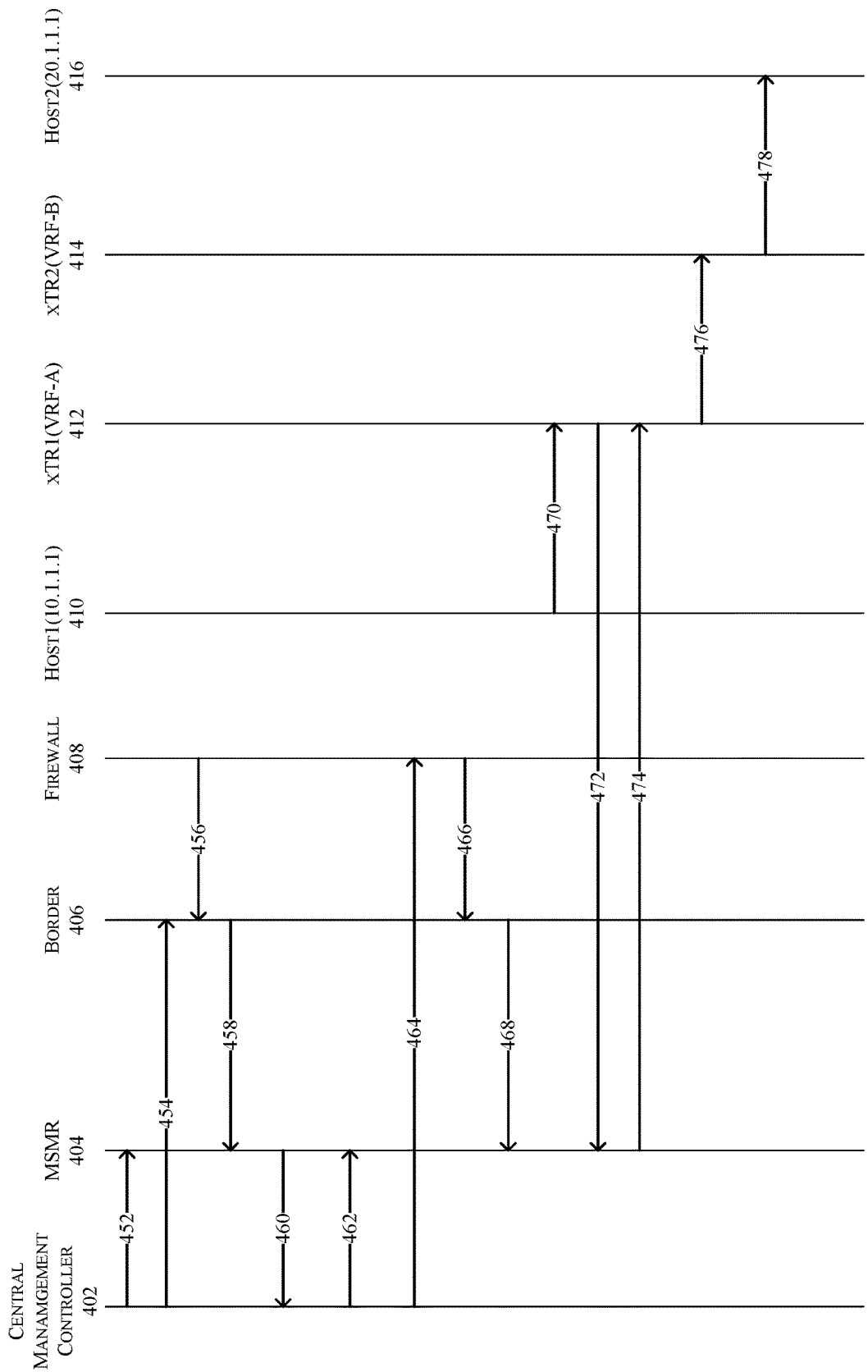
FIG. 4 is a flow diagram illustrating data and timing flow for an example in which an enterprise fabric control plane configures stateless firewall policies, with an external firewall advertising selected prefixes to attract selected VN traffic from the enterprise fabric.

FIG. 4 is a flow diagram illustrating data and timing flow for an example in which an enterprise fabric control plane configures stateless firewall policies. An external firewall advertising selected prefixes to attract selected VN traffic from the enterprise fabric.

Similar to the network for which a flow diagram is illustrated in FIG. 3, the network for which the flow diagram is illustrated in FIG. 4 includes a central management controller 402. The central management controller 402 may, for example, provide a controller and analytics platform with a single dashboard for administrators to configure the network from a centralized location. The network also includes a mapping database front end which, in the FIG. 4 example, is a LISP MSMR. The network also includes a border router 406, via which a firewall 408 is accessible to the enterprise fabric. A first host 410 (Host1) belongs to a VRF having prefix 10.1.1.1. The first host 410 is coupled to the enterprise fabric via an external router 412 (xTR1). An external router 414 (xTR2) couples a second host 416 (Host2), which belongs to a VRF having prefix 20.1.1.1, to the enterprise fabric.

At 452, the central management controller 402 communicates with the MSMR 404. In particular, the central management controller 402 communicates a message to the MSMR 404 for the MSMR 402 to configure s2s/Firewall service policy to learn ("ip-any") subscriber1 (VRF-A subnet 10/8) to subscriber2 (VRF-B subnet 20/8) firewall policy as part of the dynamic extranet policy.

At 454, the central management controller 402 communicates with the border router 406, to configure the border router 406 for a LISP "route-import" for specific prefixes advertised via the firewall 408.

At 456, the firewall 408 advertises, to the border router 406, inter-VRF prefixes (10/8 in VRF-B & 20/8 in VRF-A). This advertisement of inter-VRF prefixes by the firewall 408 is to attract inter-VRF traffic. Based at least in part on the advertisement of inter-VRF prefixes by the firewall 408, the border router 406 imports inter-VRF prefixes (10/8 in VRF-B and 20/8 in VRF-A) to register to these inter-VRF prefixes to the MSMR 404.

At 458, the border router 406 communicates with the MSMR 404. In particular, the border router 406 provides a map registration of inter-VRF prefixes to the MSMR 404 (prefix 10/8 in VRF-B and prefix 20/8 in VRF-A). The MSMR 404 adds the inter-VRF prefixes to the site registration table of the MSMR 404 for corresponding VRFs and also provides the inter-VRF prefixes for the extranet policy table. The MSMR 404 provides the inter-VRF prefixes for the extranet policy table due at least in part to the use of "ip-any" in the s2s/firewall service policy. Meanwhile, the extranet policy table of the MSMR 404 detects the prefixes as overlapping prefixes, since the 10/8 prefix of VRF-A and the 20/8 prefix of VRF-B are them as overlapping prefixes since 10/8 & 20/8 already part of VRF-A & VRF-B. In addition, the extranet policy table of the MSMR 404 accepts and "leans" the overlapping prefixes (firewall policy prefixes) in the extranet s2s/firewall service policy.

At 460, the MSMR 404 notifies the central management controller 402 that the MSMR has learned a policy with prefixes for prefixes for inter-VRF communication, and the MSMR 404 also indicates the learned prefixes to the central management controller 402.

At 462, the central management controller 402 configures the MSMR 404 with the learned policies as "configured" so that inter-VRF traffic among the learned prefixes can be validated by the MSMR 404 in place of being validated by the firewall 408.

At 464, the central management controller 402 deactivates the firewall 408 for the inter-VRF policies, at least because the MSMR 404 is configured to enforce the inter-VRF policies.

At 466, the firewall communicates with the border router 406 to withdraw the inter-VRF routes from the border router 406 and, at 468, the border router 406 communicates with the MSMR 404 to deregister the inter-VRF prefixes.

At 470, the Host1(10.1.1.1) 410 sends traffic to the external router 412 xTR1(VRF-A). More specifically, the external router 412 xTR1(VRF-A) receives traffic from source Host1 410 in subnet 10/8 to destination Host2 412 in subnet 20/8.

At 472, the external router 412 xTR1(VRF-A) communicates with the MSMR 404, to request a map for a destination in VRF-B (20/8). The MSMR 404 looks up in own instance table, then looks up in the extranet table and then in the service policy table of the source instance. The MSMR finds the VRF-B 20/8 subnet address in the s2s/firewall policy table.

At 474, the MSMR 404 communicates with the external router 412 xTR1(VRF-A), to map reply with the RLOC of the external router 414 xTR2(VRF-B) if the s2s/firewall policy allows 10/8 to 20/8 inter-VRF communication. Otherwise, the MSMR replies with a Negative Map-Reply, with "drop." In this case, the MSMR 404 applies a stateless firewall policy, and the firewall 408 itself need not apply that stateless firewall policy.

The external router 412 xTR1(VRF-A) receives a map-reply with the external router 414 xTR2 RLOC, which it installs in its map cache, which it installs in its map-cache per inter-VRF policy.

At 476 the external router 412 xTR1(VRF-A) sends encapsulated traffic to the external router 414 xTR2(VRF-B). At 478, the external router 414 decapsulates the traffic and sends the decapsulated packet to the Host2(20.1.1.1) 416.

As illustrated by the FIG. 4 flow diagram, the MSMR 404 can handle stateless firewall policies, thus lessening the involvement of the firewall 308 with the validation of inter-VRF traffic.

Figure 5:
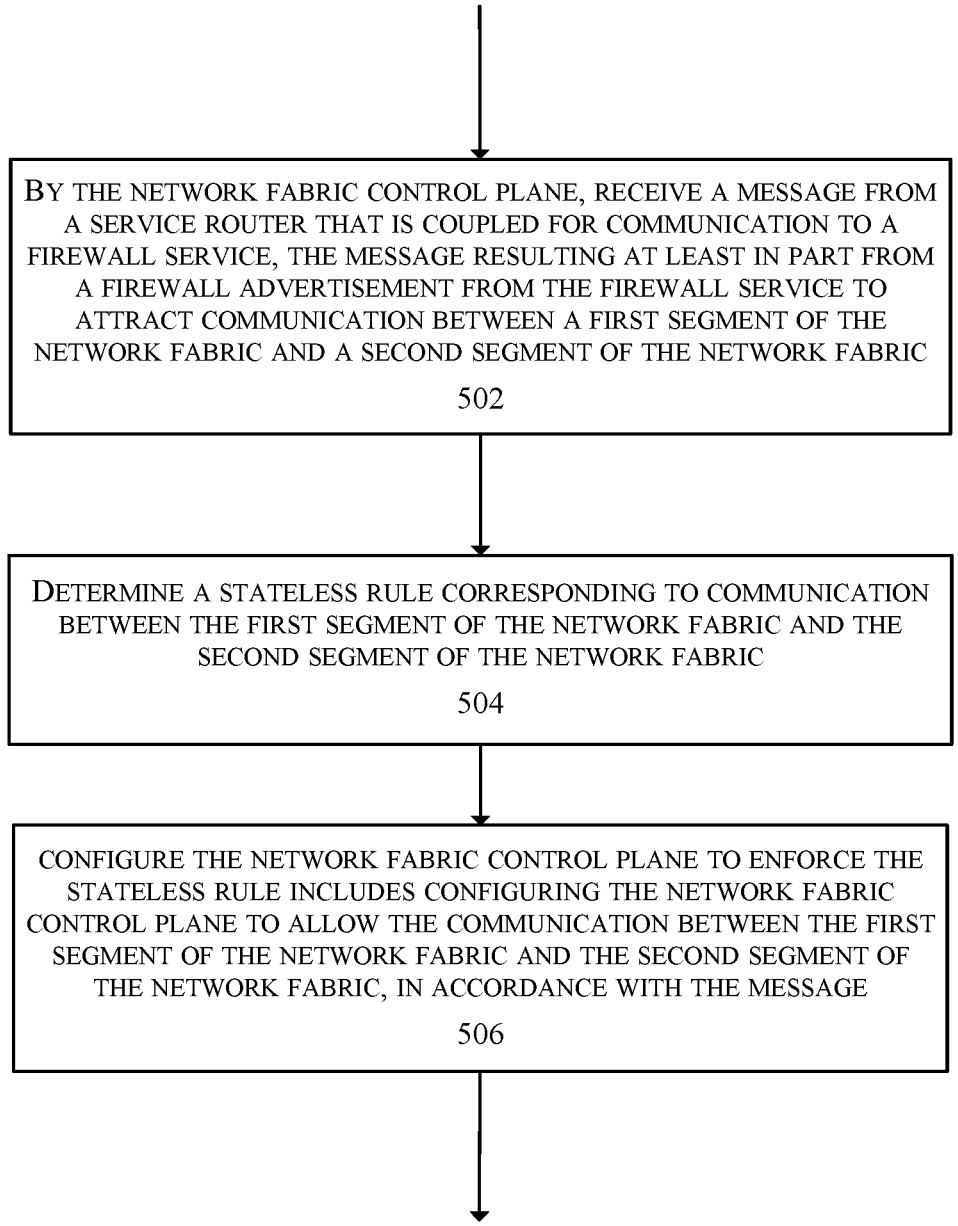
FIG. 5 is a flowchart illustrating an example process to configure a network fabric control plane to apply stateless firewall policies to inter-segment communication within the network fabric.

FIG. 5 is a flowchart illustrating an example process by which a network fabric control plane in a network fabric may be configured with stateless firewall policies for application to inter-segment communication within the network fabric. The network fabric control plane may comprise a computer having one or more processors to carry out operations that include applying the stateless firewall policies to inter-segment communication within the network fabric. For example, in a network fabric operating according to a LISP protocol, the network fabric control plane may include a MSMR configured to, among other things, translate source and/or destination indications in messages into identifiers that may be used to route the messages through a network.

At 502, the network fabric control plane receives a message from a service router that is coupled for communication to a firewall service. The message results at least in part from a firewall advertisement from the firewall service to attract communication between a first segment of the network fabric and a second segment of the network fabric. For example, the firewall may be a standard firewall configured to monitor network traffic and permit or block data packets based on a set of security rules.

At 504, the network fabric control plane determines a stateless rule corresponding to communication between the first segment of the network fabric and the second segment of the network fabric. For example, the network fabric control plane may process the message received from the firewall and determine that communication is allowed between the first segment and the second segment, according to a policy with which the firewall is configured.

At 506, the network fabric control plane is configured with a policy to allow communication between the first segment and the second segment, as indicated by the message received from the firewall and processed by the network fabric control plane. For example, the network fabric control plane may configure an extranet policy table of the network fabric control plane with a stateless firewall policy indicating that communication is allowed between the first segment and the second segment.

As a result, the network fabric control plane may be configured to apply policies to inter-segment network traffic, thus lessening the involvement of the firewall service with the validation of inter-segment network traffic.

Figure 6:
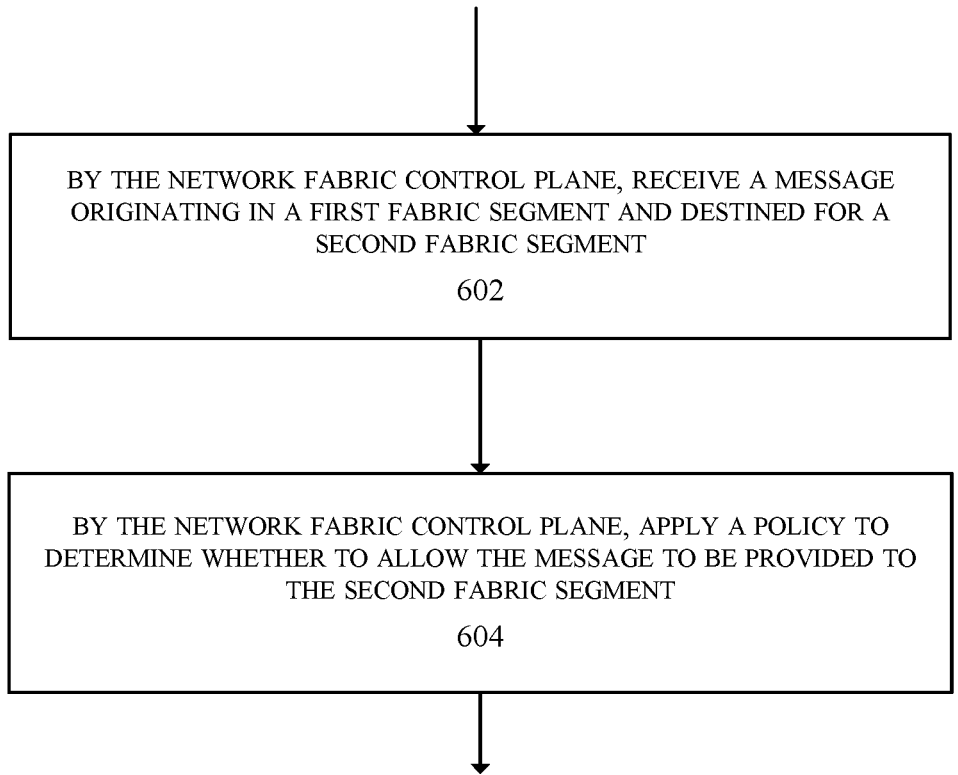
FIG. 6 is a flowchart illustrating a process for a network fabric control plane to apply policies to inter-segment network traffic.

The network fabric control plane, configured with policies for inter-segment network traffic, may apply the policies with minimal to no involvement from a firewall service. For example, FIG. 6 is a flowchart illustrating a process for a network fabric control plane to apply policies to inter-segment network traffic.

At 602, the network fabric control plane receives a message originating in a first fabric segment and destined for a second fabric segment. For example, the network fabric control plane may be an MSMR of a network fabric operating according to a LISP protocol.

At 604, the network fabric control plane applies a policy to determine whether to allow the message to be provided to the second fabric segment. The policy may be, for example, a stateless firewall policy with which the network fabric control plane is configured. The network fabric control plane may have learned the stateless firewall policy as a result of an external firewall service advertising routes to attract intersegment network traffic.

While the network fabric control plane may include an MSMR of a network fabric operating according to a LISP protocol, the techniques described herein are not limited to a network fabric operating according to a LISP protocol. For example, the LISP protocol operates according to a "pull" model, wherein information utilized to forward packets (i.e., mappings) are obtained on demand. Other protocols, such as border gateway protocol (BGP) operate according to a "push" model, wherein routing information is advertised to network devices prior to the time the routing information is needed. The techniques described herein are applicable to pull-model protocols other than the LISP protocol. Furthermore, the techniques described herein are applicable to push-model protocols such as BGP EVPN with centralized router reflector and other push-model protocols with a centralized entity like an MSMR.

Figure 7:
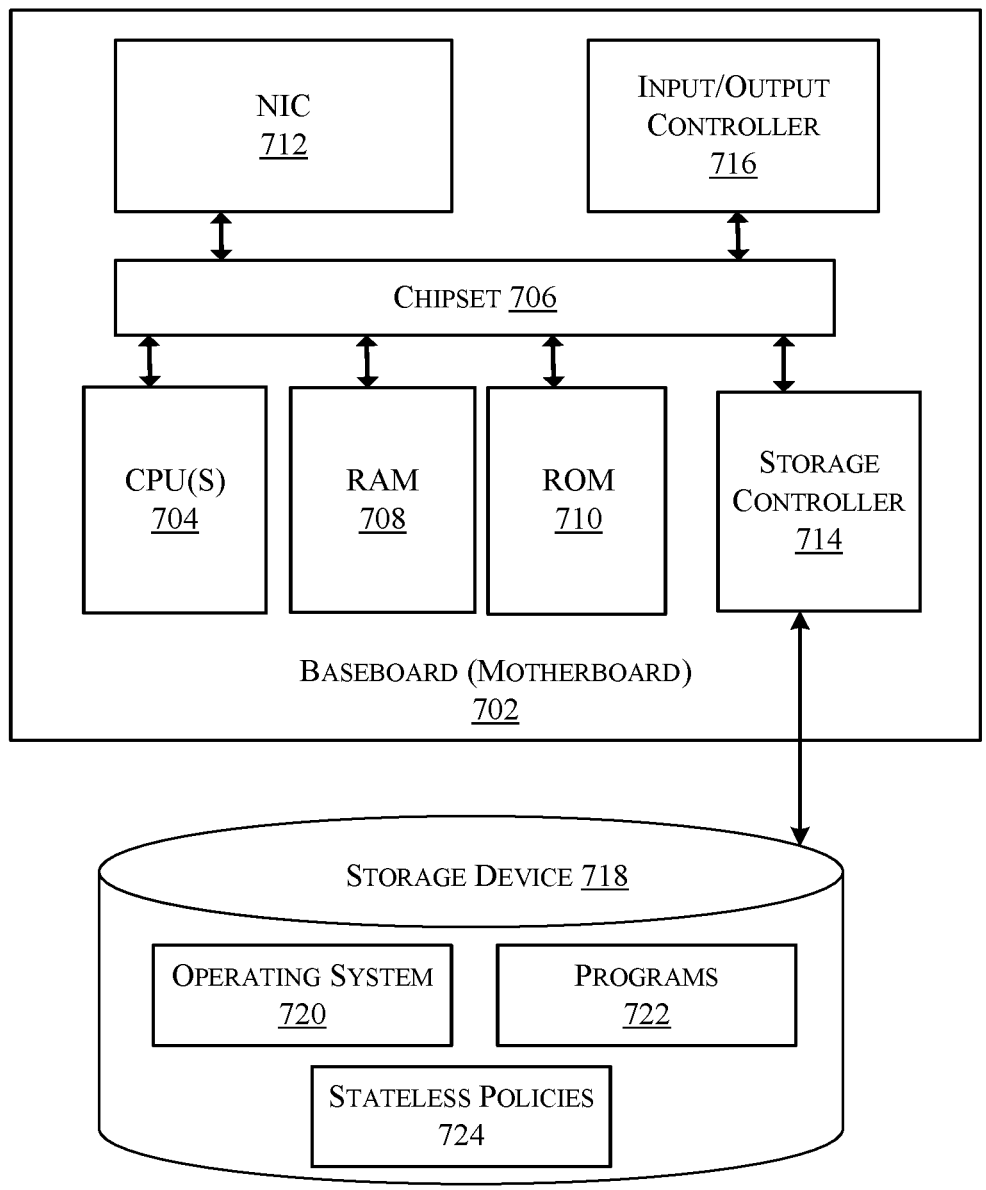
FIG. 7 illustrates an example computer architecture for a computer capable of executing program components for implementing the functionality described herein.

FIG. 7 illustrates an example computer architecture for a computer 700 capable of executing program components for implementing the functionality described above. The computer architecture shown in FIG. 7 illustrates an architecture of a server computer, workstation, desktop computer, laptop, tablet, network appliance, e-reader, smartphone, network switch, or other computing device, and can be utilized to execute any of the software components presented herein. The computer 700 may, in some examples, correspond to a network infrastructure device discussed herein.

The computer 700 includes a baseboard 702, or "motherboard," which may be a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be, for example, standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein. As illustrated in FIG. 7, the ROM 710 or NVRAM can also store data usable by the computer 700 to generate and/or process attestation information in messages exchanged among the computer 700 and other devices. In other examples, this data may be stored elsewhere, such as in RAM 708.

The computer 700 can operate in a networked environment using logical connections to remote computing devices and computer systems through a network. For example, the chipset 706 can include functionality for providing network connectivity through a Network Interface Controller (NIC) 712, such as a gigabit Ethernet adapter. The NIC 712 can connect the computer 700 to other computing devices over a network. It should be appreciated that multiple NICs 712 can be present in the computer 700, connecting the computer to other types of networks and remote computer systems. In some instances, the NICs 712 may include at least one ingress port and/or at least one egress port. An input/output controller 716 may be provided for other types of input/output.

The computer 700 can be connected to a storage device 718 that provides non-volatile storage for the computer. The storage device 718 can store an operating system 720, programs 722, and data 724, for example. The storage device 718 can be connected to the computer 700 through a storage controller 714 connected to the chipset 706. The storage device 718 can include one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The data 724 may include, for example, stateless policies for inter-segment communication in a network fabric by a network fabric control plane. The stateless policies may include, for example, an indication of a source prefix and an indication of a destination prefix for, respectively, a source subscriber device in a first segment and a destination subscriber device in a second segment, for which the policy indicates allowable communication between the source subscriber device and the destination subscriber device, for inter-segment communication in the network fabric. The computer, as part of the network fabric control plane, may apply the stateless plies for inter-segment communication to communication within the network fabric.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like. For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the storage device 718 described above, the computer 700 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 700.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method comprising:
    determining a stateless rule corresponding to communication between a first virtual forwarding and routing (VRF) segment of a network fabric and a second VRF segment of the network fabric, the stateless rule being usable to enforce network policy on communications between the first and second VRF segments;
    receiving first network layer prefixes associated with first subscriber devices in the first VRF segment and second network layer prefixes associated with second subscriber devices in the second VRF segment;
    receiving a packet sent from a first subscriber device of the first VRF, the packet having a source address that is included in the first network layer prefixes and a destination address included in the second network layer prefixes; and
    determining, using the stateless rule, the source address, and the destination address, that the packet is allowed to be communicated from the first VRF and to the second VRF.

2. The method of claim 1, wherein the network fabric is of a BGP EVPN type.

3. The method of claim 1, wherein:
    the first network layer prefixes and second network layer prefixes are received at a network device of the network fabric;
    the first network layer prefixes and second network layer prefixes are pushed to the network device according to push model of communication; and
    the first network layer prefixes and second network layer prefixes are received at the network device prior to the packet being received.

4. The method of claim 1, wherein the first network layer prefixes and second network layer prefixes are received, from a centralized router reflector, at a network device of the network fabric that is of a BGP EVPN type.

5. The method of claim 1, further comprising:
   determining an overlap between the source address associated with the first VRF segment and the destination address associated with the second VRF segment; and
   enabling communication between the first VRF segment and the second VRF segment based at least in part on the overlap.

6. The method of claim 1, wherein stateless rule is enforced by a firewall device, further comprising sending, from the firewall device, an advertisement message indicating routes associated with at least one of the first network layer prefixes or the second network layer prefixes.

7. The method of claim 6, wherein the advertisement message includes an indication of a specific prefix, to attract inter-VRF segment communication from at least one subscriber associated with the specific prefix.

8. A network device comprising:
   one or more processors; and
   one or more computer-readable media storing computer-executable instructions that, when executed by the one or more processors, cause the one or more processors to perform operations comprising:
      receiving a stateless rule corresponding to communication between a first virtual forwarding and routing (VRF) segment of a network fabric and a second VRF segment of the network fabric, the stateless rule being usable to enforce network policy on communications between the first and second VRF segments;
      receiving first network layer prefixes associated with first subscriber devices in the first VRF segment and second network layer prefixes associated with second subscriber devices in the second VRF segment;
      receiving a packet sent from a first subscriber device of the first VRF, the packet having a source address that is included in the first network layer prefixes and a destination address included in the second network layer prefixes; and
      determining, using the stateless rule, the source address, and the destination address, that the packet is allowed to be communicated from the first VRF and to the second VRF.

9. The network device of claim 8, wherein the network fabric is of a BGP EVPN type.

10. The network device of claim 8, wherein:
    the first network layer prefixes and second network layer prefixes are pushed to the network device according to push model of communication; and
    the first network layer prefixes and second network layer prefixes are received at the network device prior to the packet being received.

11. The network device of claim 8, wherein the first network layer prefixes and second network layer prefixes are received, from a centralized router reflector, at a network device of the network fabric that is of a BGP EVPN type.

12. The network device of claim 8, the operations further comprising:
    determining an overlap between the source address associated with the first VRF segment and the destination address associated with the second VRF segment; and
    enabling communication between the first VRF segment and the second VRF segment based at least in part on the overlap.

13. The network device of claim 8, wherein network device is a4 firewall device, the operations further comprising sending, from the firewall device, an advertisement message indicating routes associated with at least one of the first network layer prefixes or the second network layer prefixes.

14. The network device of claim 13, wherein the advertisement message includes an indication of a specific prefix, to attract inter-VRF segment communication from at least one subscriber associated with the specific prefix.

15. A system comprising:
    one or more processors; and
    one or more computer-readable media storing computer-executable instructions that, when executed by the one or more processors, cause the one or more processors to perform operations comprising:
       receiving a stateless rule corresponding to communication between a first virtual forwarding and routing (VRF) segment of a network fabric and a second VRF segment of the network fabric, the stateless rule being usable to enforce network policy on communications between the first and second VRF segments;
       receiving first network layer prefixes associated with first subscriber devices in the first VRF segment and second network layer prefixes associated with second subscriber devices in the second VRF segment;
       receiving a packet sent from a first subscriber device of the first VRF, the packet having a source address that is included in the first network layer prefixes and a destination address included in the second network layer prefixes; and
       determining, using the stateless rule, the source address, and the destination address, that the packet is allowed to be communicated from the first VRF and to the second VRF.

16. The system of claim 15, wherein the network fabric is of a BGP EVPN type.

17. The system of claim 15, wherein:
    the first network layer prefixes and second network layer prefixes are pushed to a network device of the system according to push model of communication; and
    the first network layer prefixes and second network layer prefixes are received at the network device prior to the packet being received.

18. The system of claim 15, wherein the first network layer prefixes and second network layer prefixes are received, from a centralized router reflector, at a network device of the system in the network fabric that is of a BGP EVPN type.

19. The system of claim 15, wherein system includes a firewall device, the operations further comprising sending, from the firewall device, an advertisement message indicating routes associated with at least one of the first network layer prefixes or the second network layer prefixes.

20. The system of claim 19, wherein the advertisement message includes an indication of a specific prefix, to attract inter-VRF segment communication from at least one subscriber associated with the specific prefix.

* * * * *